(12) United States Patent
Conlon

(10) Patent No.: US 9,302,574 B2
(45) Date of Patent: Apr. 5, 2016

(54) ELECTRICALLY VARIABLE TRANSMISSION FOR A HYBRID VEHICLE USING FLYWHEEL KINETIC ENERGY RECOVERY

(71) Applicant: GM Global Technology Operations LLC, Detroit, MI (US)

(72) Inventor: Brendan M. Conlon, Rochester Hills, NY (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 13/870,868

(22) Filed: Apr. 25, 2013

(65) Prior Publication Data

US 2014/0248984 A1 Sep. 4, 2014

Related U.S. Application Data

(60) Provisional application No. 61/771,317, filed on Mar. 1, 2013.

(51) Int. Cl.
| | |
|---|---|
| *B60K 6/365* | (2007.10) |
| *B60K 6/10* | (2006.01) |
| *B60K 6/387* | (2007.10) |
| *B60K 6/52* | (2007.10) |
| *B60K 6/38* | (2007.10) |

(52) U.S. Cl.
CPC ............ *B60K 6/105* (2013.01); *B60K 6/365* (2013.01); *B60K 6/387* (2013.01); *B60K 6/52* (2013.01); *B60K 2006/381* (2013.01); *Y02T 10/6204* (2013.01); *Y02T 10/6265* (2013.01); *Y02T 10/92* (2013.01)

(58) Field of Classification Search
None
See application file for complete search history.

(56) References Cited

U.S. PATENT DOCUMENTS

| | | | | |
|---|---|---|---|---|
| 3,923,115 | A * | 12/1975 | Helling | 180/65.25 |
| 7,867,124 | B2 | 1/2011 | Conlon et al. | |
| 7,963,874 | B2 | 6/2011 | Conlon | |
| 2010/0248891 | A1* | 9/2010 | Wittkopp et al. | 477/3 |
| 2010/0304920 | A1* | 12/2010 | Simon | 477/3 |
| 2011/0320075 | A1* | 12/2011 | Kim et al. | 701/22 |
| 2012/0196721 | A1* | 8/2012 | He et al. | 477/3 |

* cited by examiner

*Primary Examiner* — Erin D Bishop
(74) *Attorney, Agent, or Firm* — Harness, Dickey & Pierce, P.L.C.

(57) ABSTRACT

An electrically variable transmission for a hybrid vehicle includes a pair of drive wheels each driven by a final drive gear/differential mechanism. A planetary differential gear set including a plurality of components provides drive torque to the final drive gear/differential mechanism. A first motor generator is drivingly connected to a first component of the plurality of components of the planetary differential gear set. A second motor generator is drivingly connected to a second component of the plurality of components of the planetary differential gear set. A flywheel is drivingly connected to the planetary differential gear set by a reduction gear. A first brake is connected to one of the plurality of components of the planetary differential gear set.

11 Claims, 6 Drawing Sheets

ELECTRICALLY VARIABLE TRANSMISSION FOR A HYBRID VEHICLE USING FLYWHEEL KINETIC ENERGY RECOVERY

CROSS-REFERENCE TO RELATED APPLICATIONS

This application claims the benefit of U.S. Provisional Application No. 61/771,317, filed on Mar. 1, 2013. The entire disclosure of the above application is incorporated herein by reference.

FIELD

The present disclosure relates to an electrically variable transmission for a hybrid vehicle using flywheel kinetic energy recovery.

BACKGROUND

This section provides background information related to the present disclosure which is not necessarily prior art.

Hybrid vehicles operate using stored electric energy for powering an electric motor and an internal combustion engine. Some hybrid vehicles have employed regenerative braking to capture braking energy that is converted into electricity and stored in a battery to improve the vehicle efficiency. Other measures to improve hybrid vehicle efficiency and performance are still desired.

SUMMARY

This section provides a general summary of the disclosure, and is not a comprehensive disclosure of its full scope or all of its features.

An electrically variable transmission for a hybrid vehicle includes a pair of drive wheels each driven by a final drive gear/differential mechanism. A planetary differential gear set including a plurality of components provides drive torque to the final drive gear/differential mechanism. A first motor generator is drivingly connected to a first component of the plurality of components of the planetary differential gear set. A second motor generator is drivingly connected to a second component of the plurality of components of the planetary differential gear set. A flywheel is drivingly connected to the planetary differential gear set by a reduction gear. A first brake is connected to one of the plurality of components of the planetary differential gear set.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
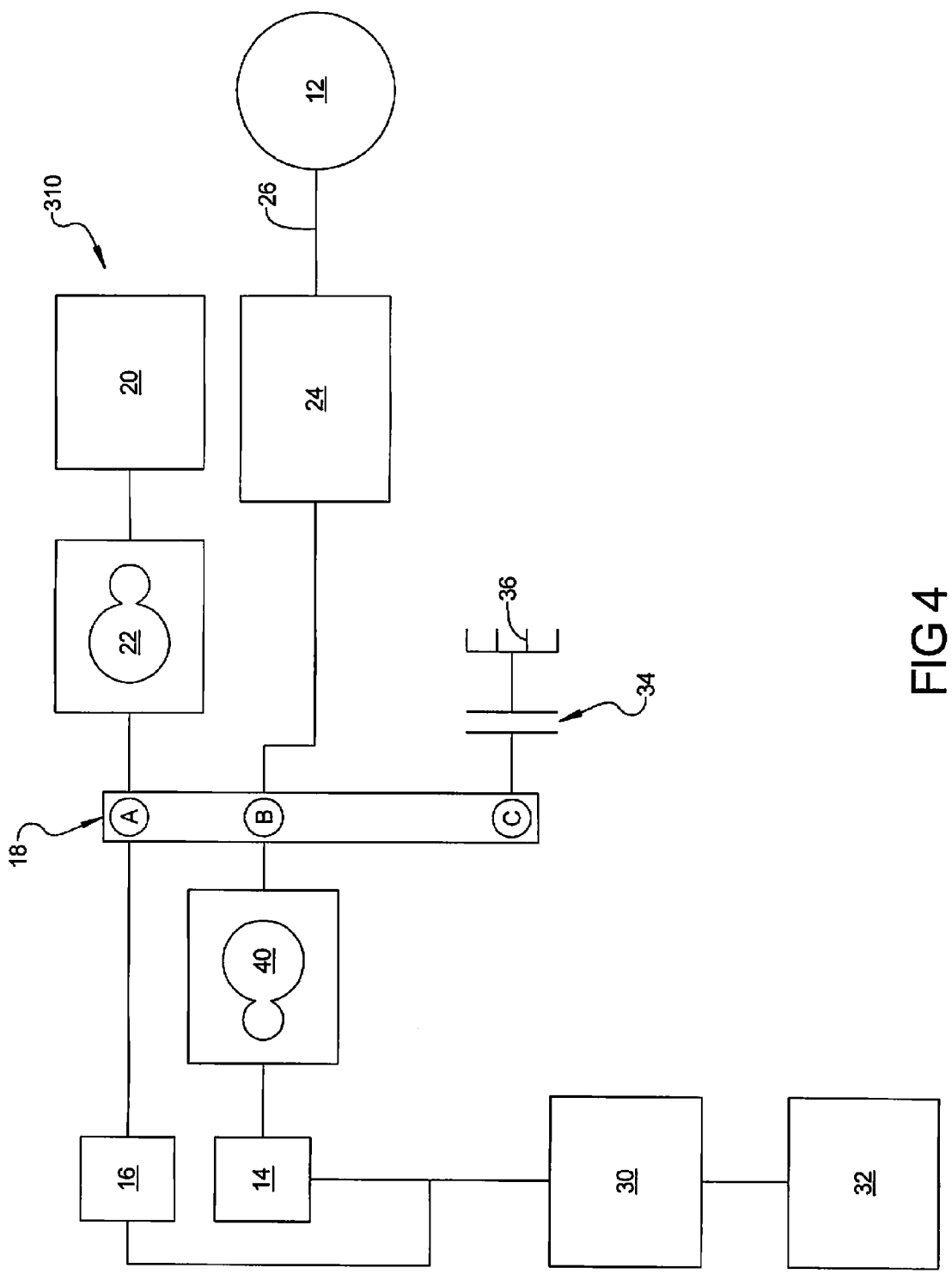
Figure 5:
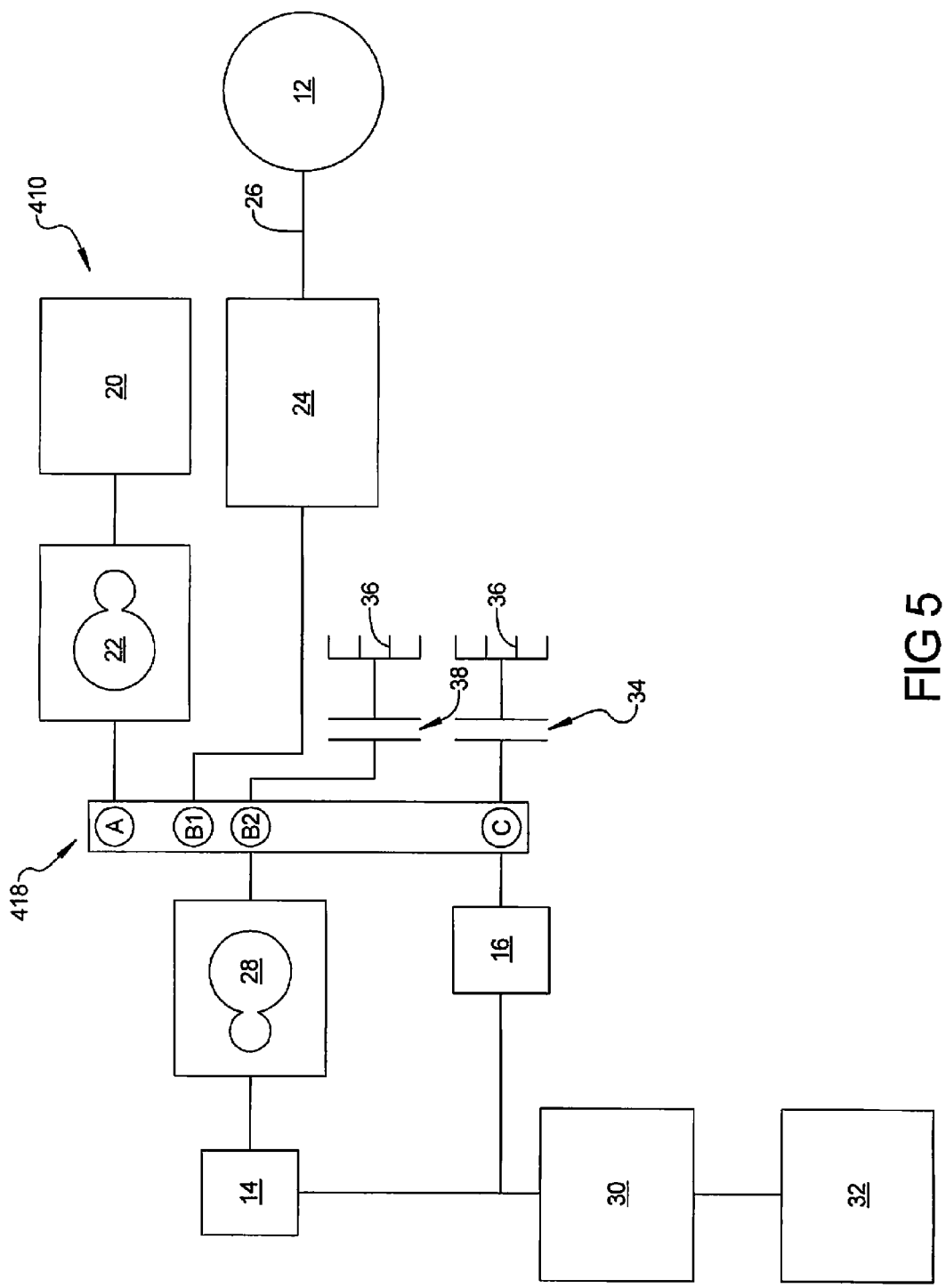
Figure 6:
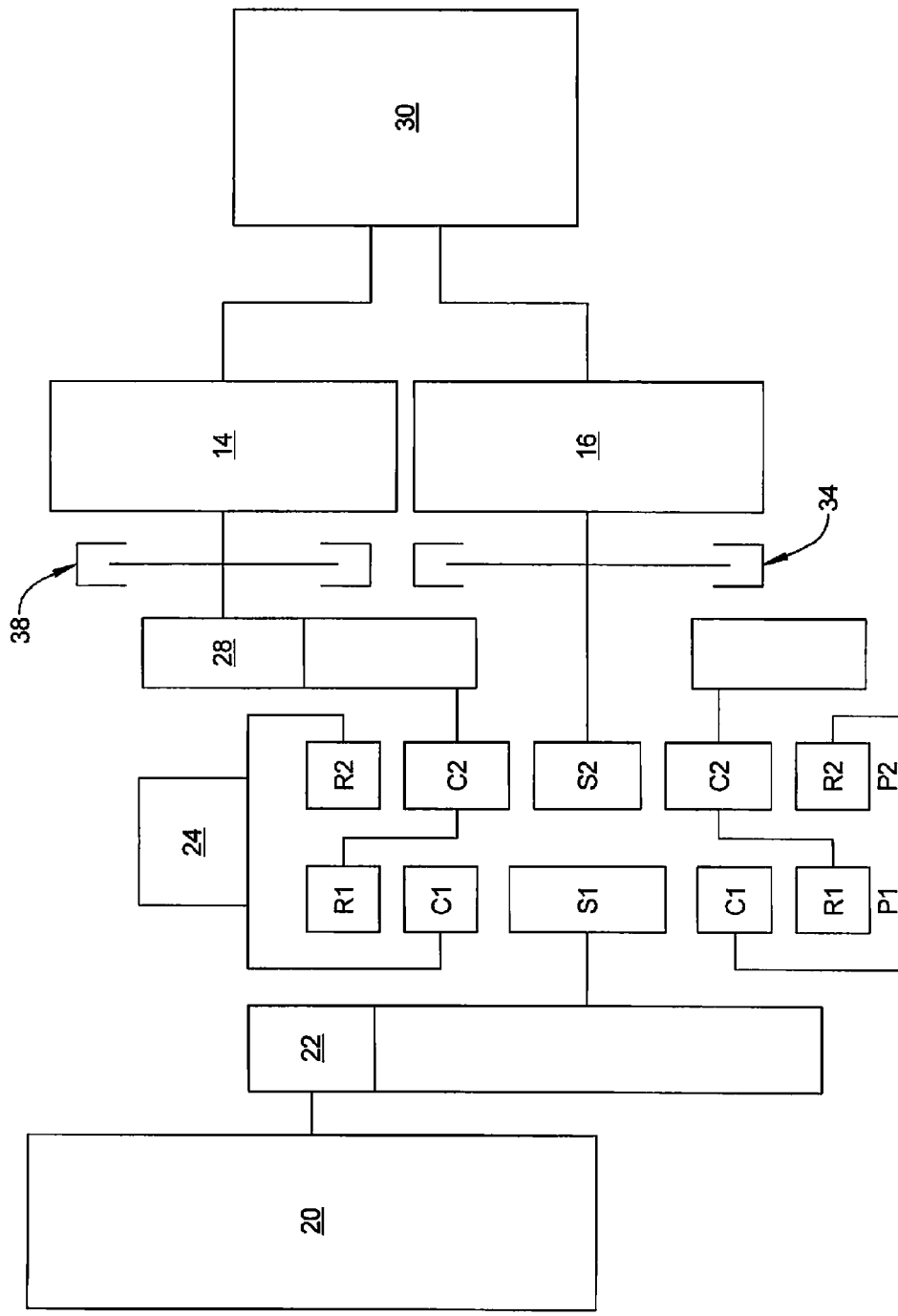

FIG. 4 is a schematic illustration of an electrically variable transmission of a hybrid vehicle having a series configuration with flywheel kinetic energy recovery, according to a fourth embodiment of the present disclosure; and FIGS. 5 and 6 are schematic illustrations of an electrically variable transmission of a hybrid vehicle having a compound split configuration with flywheel kinetic energy recovery, according to a fifth embodiment of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides a single mode electrically variable transmission with one or more clutches to create a flywheel charge/discharge control device covering a wide range of flywheel to vehicle speeds and capable of high power charge/discharge at good efficiency. In the past, kinetic energy recovery systems have been implemented using either multiple fixed ratios with clutches or continuously variable transmissions. Clutched systems are generally less efficient than electrical systems but are capable of high power discharge for short durations. The present disclosure provides both high efficiency and high power capability over a wide speed range. The system uses relatively few clutches to cover a large vehicle speed range, since it has use of the electrically variable transmission system to control flywheel speed efficiently throughout the speed range. Using the electrically variable transmission, it can also control the flywheel speed relative to vehicle speed during driving in order to optimize charge/discharge capability using the clutches.

Figure 1:
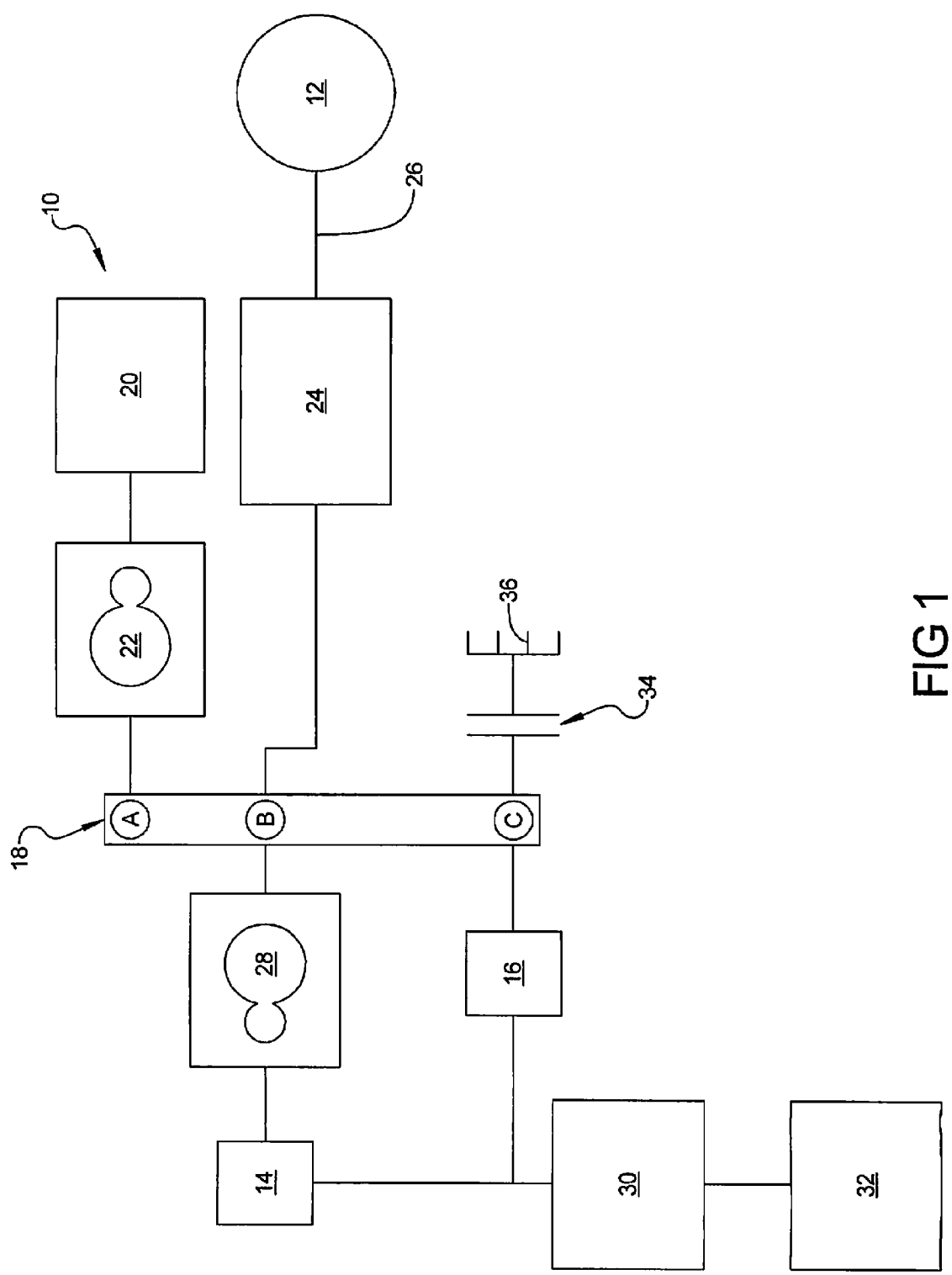
FIG. 1 is a schematic illustration of an electrically variable transmission of a hybrid vehicle having an input split configuration with flywheel kinetic energy recovery, according to the principles of the present disclosure.

With reference to FIG. 1, an electrically variable transmission 10 of a hybrid vehicle will now be described. The electrically variable transmission 10 has an input split configuration. The hybrid vehicle can include an engine that supplies drive torque through a transmission to a pair of drive wheels. The electrically variable transmission 10 can be implemented either on the same or separate axle from the driven axle for driving a pair of drive wheels 12. The electrically variable transmission 10 includes a first motor generator 14 and a second motor generator 16 to provide driving input to a planetary gear set or differential gear set 18 that is represented in lever diagram form by a three-node lever (described in further detail herein). A flywheel 20 is also drivingly connected to the planetary/differential gear set 18 by a reduction gear 22. The planetary/differential gear set 18 is also connected to a final drive gear/differential 24 that provides drive torque to the drive wheels 12 via a drive axle 26. The first motor generator 14 is connected to the planetary gear set 18 by a reduction gear 28. The first motor generator 14 and the second motor generator 16 are each controlled by a controller 30 which is connected to the vehicle electrical system 32 including a battery which can provide or receive electrical power to and from the first and second motor generators 14, 16.

The planetary/differential gear set 18 is represented by a three-node lever having a first member, a second member, and a third member which are represented by nodes A, B, and C, respectively. The members may be a ring gear member A, a sun gear member C, and a carrier member B. As used herein, a "node" is a component of a transmission, such as a ring gear member, a carrier member, or a sun gear member, which is characterized by a rotational speed and which can act as a junction of torques applied to that component from other components, and by that component to other components. The other components which may interact with a given node include other coaxial members of the same set of planetary gears which appear as other nodes on the same lever. The other components which may interact with a given node also include interconnections to members of other planetary gear sets which appear as additional nodes along the lever.

As illustrated in FIG. 1, the flywheel 20 is connected through the reduction gear 22 to the node A representing the ring gear of the planetary gear set 18. The first motor generator 14 is connected through a reduction gear 28 to the second node B which is representative of the planetary carrier of the planetary gear set 18. The second motor generator 16 is connected to the node C which is representative of the sun gear of the planetary gear set 18. The sun gear represented by node C is also connected to a brake 34 which can selectively engage the sun gear to the housing 36 of the planetary gear set 18 to provide resistance to or prevent rotation of the sun gear C.

The present disclosure combines a single mode electrically variable transmission with the brake 34 on the sun gear C to create a flywheel charge/discharge control device covering a wide range of flywheel to vehicle speeds and capable of high power charge/discharge at good efficiency. Typically during driving, the flywheel 20 would be maintained within a speed band so that it is capable of accepting significant power from the system. However, when the vehicle is initially turned on, the flywheel 20 would normally be at zero speed. While the vehicle is being accelerated, the control system 30 would begin to charge the flywheel 20 to its minimum operating speed using the electrically variable transmission 10 to transfer power from the axle 26 to the flywheel 20. Once the flywheel 20 is at a minimum speed, it would be maintained at that speed by the electrically variable transmission 10. When the vehicle brakes are applied, the controller 30 would control the electrically variable transmission to apply a braking torque to the axle 26 and increase the speed of the flywheel 20. At low braking levels, the friction brake 34 would not be needed, however the friction brake 34 could be used at high braking levels within a predetermined range of vehicle and flywheel speeds where the clutch slip speed allows braking torque to be produced efficiently. After the braking maneuver is completed, the control system 30 would allow the flywheel energy to be discharged during acceleration, either when it provides a fuel economy benefit, or when desired for vehicle performance. Use of the electrically variable transmission 10 allows the flywheel 20 to be efficiently discharged even in very low vehicle speeds. At high vehicle speeds and high acceleration levels, the friction brake 34 would be used to increase the discharge rate of the flywheel 20 beyond what the electrically variable transmission 10 can support. As an example, the electrically variable transmission system could be sized to produce up to 0.1 G acceleration/deceleration rate, with maximum flywheel charge/discharge power of roughly 60 kW using the electrically variable transmission only. At higher vehicle speeds, use of the friction brake 34 would then allow the power transfer rate to exceed 100 kW.

Figure 2:
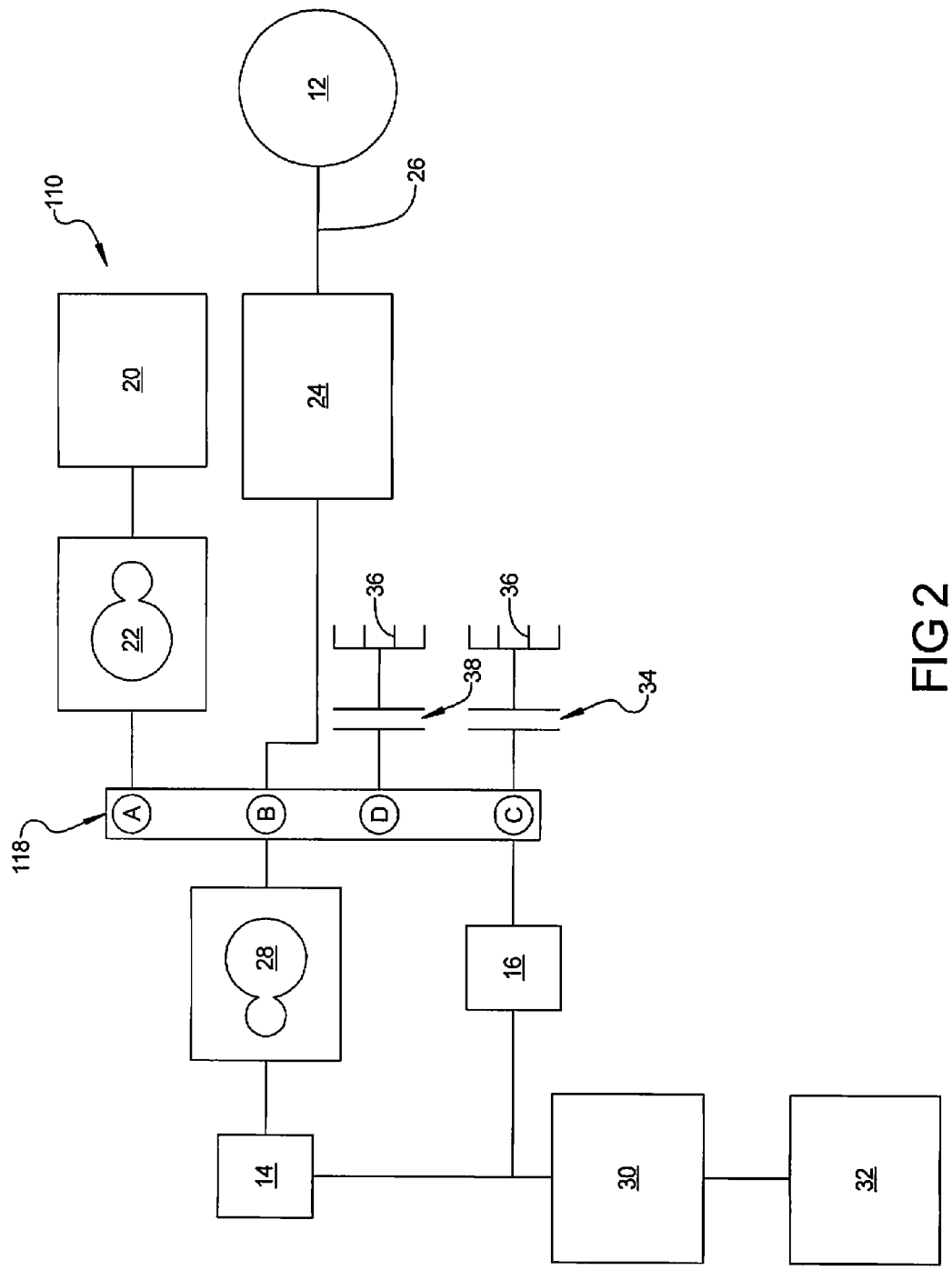
FIG. 2 is a schematic illustration of an electrically variable transmission of a hybrid vehicle having an input split configuration with two clutches and with flywheel kinetic energy recovery, according to a second embodiment of the present disclosure.

With reference to FIG. 2, an electrically variable transmission 110 of a hybrid vehicle will now be described. The electrically variable transmission 110 has an input split configuration with two clutches. The hybrid vehicle can include an engine that supplies drive torque through a transmission to a pair of drive wheels. The electrically variable transmission 110 can be implemented either on the same or separate axle from the driven axle for driving a pair of drive wheels 12. The electrically variable transmission 110 includes a first motor generator 14 and a second motor generator 16 to provide driving input to a planetary gear set or differential gear set 118 that is represented in lever diagram form by a four-node lever (described in further detail herein). A flywheel 20 is also drivingly connected to the planetary/differential gear set 118 by a reduction gear 22. The planetary/differential gear set 18 is also connected to a final drive gear/differential 24 that provides drive torque to the drive wheels 12 via a drive axle 26. The first motor generator 14 is connected to the planetary gear set 118 by a reduction gear 28. The first motor generator 14 and the second motor generator 16 are each controlled by a controller 30 which is connected to the vehicle electrical system 32 including a battery which can provide or receive electrical power to and from the first and second motor generators 14, 16.

The planetary/differential gear set 118 is represented by a four-node lever having a first member, a second member, a third member, and a fourth member which are represented by nodes A, B, C and D, respectively. The planetary/differential gear set can be a multi stage Simpson-type planetary gear set wherein the members may be a ring gear member A of a first of the multiple planetary gear sets, a sun gear member C that includes sun gears that are interconnected between the first and second of the multiple planetary gear sets, an interconnected carrier member from the first planetary gear set and the ring gear from the second planetary gear set B, and a carrier member from the second planetary gear set D. As used herein, a "node" is a component of a transmission, such as a ring gear member, a carrier member, or a sun gear member, which is characterized by a rotational speed and which can act as a junction of torques applied to that component from other components, and by that component to other components. The other components which may interact with a given node include other coaxial members of the same set of planetary gears which appear as other nodes on the same lever. The other components which may interact with a given node also include interconnections to members of other planetary gear sets which appear as additional nodes along the lever.

As illustrated in FIG. 2, the flywheel 20 is connected through the reduction gear 22 to the node A representing the first ring gear of the multi-stage planetary gear set 118. The first motor generator 14 is connected through a reduction gear 28 to the second node B which is representative of the planetary carrier of the first planetary gear set and a ring gear of the second planetary gear set of the multi-stage planetary gear set 118. The second motor generator 16 is connected to the node C which is representative of each of the interconnected sun gears of the multi-stage planetary gear set 118. The sun gears represented by node C are also connected to a brake 34 which can selectively engage the sun gears to the housing 36 of the planetary gear set 118 to provide resistance to or prevent rotation of the sun gears C. The carrier of the second planetary gear set of the multi-stage planetary gear set 118 represented by node D is connected to a second brake 38 which can selectively engage the carrier D of the second planetary gear set to the housing 36 to provide resistance or prevent rotation of the carrier D.

The present disclosure combines a single mode electrically variable transmission with a pair of brakes 34, 38 on the sun gear C and the second carrier D to create a flywheel charge/discharge control device covering a wide range of flywheel to vehicle speeds and capable of high power charge/discharge at good efficiency. Typically during driving, the flywheel 20 would be maintained within a speed band so that it is capable of accepting significant power from the system. However, when the vehicle is initially turned on, the flywheel 20 would normally be at zero speed. While the vehicle is being accelerated, the control system 30 would begin to charge the flywheel 20 to its minimum operating speed using the electrically variable transmission 110 to transfer power from the axle 26 to the flywheel 20. Once the flywheel 20 is at a minimum speed, it would be maintained at that speed by the electrically variable transmission 110. When the vehicle brakes are applied, the controller 30 would control the electrically variable transmission 110 to apply a braking torque to the axle 26 and increase the speed of the flywheel 20. At low braking levels, the friction brakes 34, 38 would not be needed, however the friction brakes 34, 38 could be used at high braking levels within a predetermined range of vehicle and flywheel speeds where the clutch slip speed allows braking torque to be produced efficiently. After the braking maneuver is completed, the control system 30 would allow the flywheel energy to be discharged during acceleration, either when it provides a fuel economy benefit, or when desired for vehicle performance. Use of the electrically variable transmission 110 allows the flywheel 20 to be efficiently discharged even in very low vehicle speeds. At high vehicle speeds and high acceleration levels, the friction brakes 34, 38 would be used to increase the discharge rate of the flywheel 20 beyond what the electrically variable transmission 10 can support.

Figure 3:
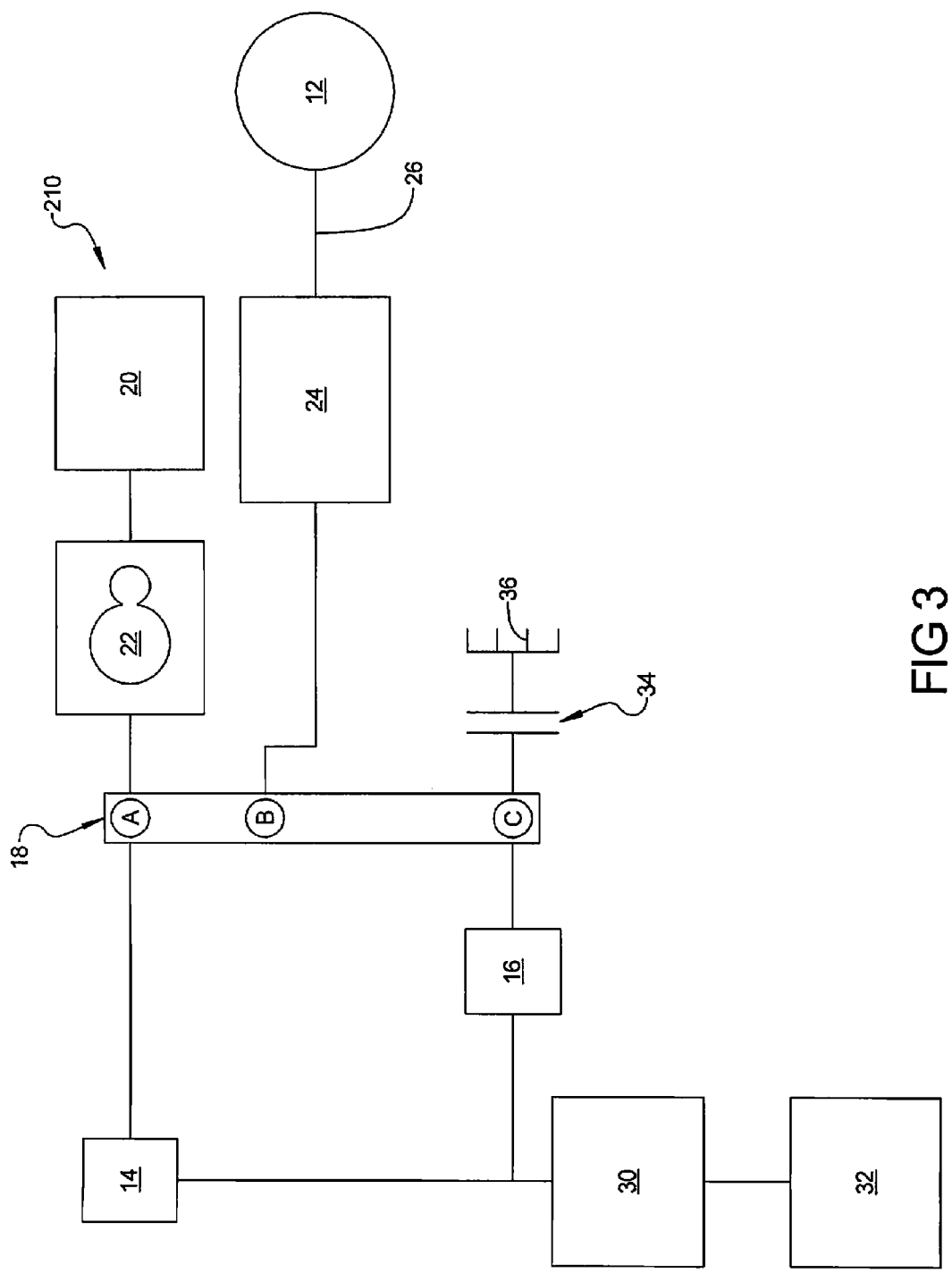
FIG. 3 is a schematic illustration of an electrically variable transmission of a hybrid vehicle having an output split configuration with flywheel kinetic energy recovery, according to a third embodiment of the present disclosure.

With reference to FIG. 3, an electrically variable transmission 210 of a hybrid vehicle will now be described. The electrically variable transmission 210 has an output split configuration. The hybrid vehicle can include an engine that supplies drive torque through a transmission to a pair of drive wheels. The electrically variable transmission 210 can be implemented either on the same or separate axle from the driven axle for driving a pair of drive wheels 12. The electrically variable transmission 210 includes a first motor generator 14 and a second motor generator 16 to provide driving input to a planetary gear set or differential gear set 18 that is represented in lever diagram form by a three-node lever (described in further detail herein). A flywheel 20 is also drivingly connected to the planetary/differential gear set 18 by a reduction gear 22. The planetary/differential gear set 18 is also connected to a final drive gear/differential 24 that provides drive torque to the drive wheels 12 via a drive axle 26. In this embodiment, as compared to the embodiment shown in FIG. 1, the first motor generator 14 is not connected to the planetary gear set 18 by a reduction gear. The first motor generator 14 and the second motor generator 16 are each controlled by a controller 30 which is connected to the vehicle electrical system 32 including a battery which can provide or receive electrical power to and from the first and second motor generators 14, 16.

The planetary/differential gear set 18 is represented by a three-node lever having a first member, a second member, and a third member which are represented by nodes A, B, and C, respectively. The members may be a ring gear member A, a sun gear member C, and a carrier member B. As used herein, a "node" is a component of a transmission, such as a ring gear member, a carrier member, or a sun gear member, which is characterized by a rotational speed and which can act as a junction of torques applied to that component from other components, and by that component to other components. The other components which may interact with a given node include other coaxial members of the same set of planetary gears which appear as other nodes on the same lever. The other components which may interact with a given node also include interconnections to members of other planetary gear sets which appear as additional nodes along the lever.

As illustrated in FIG. 3, the flywheel 20 is connected through the reduction gear 22 to the node A representing the ring gear of the planetary gear set 18. The first motor generator 14 is connected to the first node A which is representative of the ring gear of the planetary gear set 18. The second motor generator 16 is connected to the node C which is representative of the sun gear of the planetary gear set 18. The sun gear represented by node C is also connected to a brake 34 which can selectively engage the sun gear C to the housing 36 of the planetary gear set 18 to provide resistance to or prevent rotation of the sun gear C. The second node B which is representative of the planetary carrier is connected to a final drive gear/differential 24 that provides drive torque to the drive wheels 12 via a drive axle 26.

The present disclosure combines a single mode electrically variable transmission with the brake 34 on the sun gear C to create a flywheel charge/discharge control device covering a wide range of flywheel to vehicle speeds and capable of high power charge/discharge at good efficiency. Typically during driving, the flywheel 20 would be maintained within a speed band so that it is capable of accepting significant power from the system. However, when the vehicle is initially turned on, the flywheel 20 would normally be at zero speed. While the vehicle is being accelerated, the control system 30 would begin to charge the flywheel 20 to its minimum operating speed using the electrically variable transmission 210 to transfer power from the axle 26 to the flywheel 20. Once the flywheel 20 is at a minimum speed, it would be maintained at that speed by the electrically variable transmission 210. When the vehicle brakes are applied, the controller 30 would control the electrically variable transmission to apply a braking torque to the axle 26 and increase the speed of the flywheel 20. At low braking levels, the friction brake 34 would not be needed, however the friction brake 34 could be used at high braking levels within a predetermined range of vehicle and flywheel speeds where the clutch slip speed allows braking torque to be produced efficiently. After the braking maneuver is completed, the control system 30 would allow the flywheel energy to be discharged during acceleration, either when it provides a fuel economy benefit, or when desired for vehicle performance. Use of the electrically variable transmission 210 allows the flywheel 20 to be efficiently discharged even in very low vehicle speeds. At high vehicle speeds and high acceleration levels, the friction brake 34 would be used to increase the discharge rate of the flywheel 20 beyond what the electrically variable transmission 210 can support.

With reference to FIG. 4, an electrically variable transmission 310 of a hybrid vehicle will now be described. The electrically variable transmission 310 has a series configuration. The hybrid vehicle can include an engine that supplies drive torque through a transmission to a pair of drive wheels. The electrically variable transmission 310 can be implemented either on the same or separate axle from the driven axle for driving a pair of drive wheels 12. The electrically variable transmission 310 includes a first motor generator 14 and a second motor generator 16 to provide driving input to a planetary gear set or differential gear set 18 that is represented in lever diagram form by a three-node lever (described in further detail herein). A flywheel 20 is also drivingly connected to the planetary/differential gear set 18 by a reduction gear 22. The planetary/differential gear set 18 is also connected to a final drive gear/differential 24 that provides drive torque to the drive wheels 12 via a drive axle 26. The first motor generator 14 is connected to the planetary gear set 18 by a reduction gear 40. The first motor generator 14 and the second motor generator 16 are each controlled by a controller 30 which is connected to the vehicle electrical system 32 including a battery which can provide or receive electrical power to and from the first and second motor generators 14, 16.

The planetary/differential gear set 18 is represented by a three-node lever having a first member, a second member, and a third member which are represented by nodes A, B, and C, respectively. The members may be a ring gear member A, a sun gear member C, and a carrier member B. As used herein, a "node" is a component of a transmission, such as a ring gear member, a carrier member, or a sun gear member, which is characterized by a rotational speed and which can act as a junction of torques applied to that component from other components, and by that component to other components. The other components which may interact with a given node include other coaxial members of the same set of planetary gears which appear as other nodes on the same lever. The other components which may interact with a given node also include interconnections to members of other planetary gear sets which appear as additional nodes along the lever.

As illustrated in FIG. 4, the flywheel 20 is connected through the reduction gear 22 to the node A representing the ring gear of the planetary gear set 18. The first motor generator 14 is connected through a reduction gear 40 to the second node B which is representative of the planetary carrier of the planetary gear set 18. The second motor generator 16 is connected to the node A which is representative of the ring gear of the planetary gear set 18. The sun gear represented by node C is connected to a brake 34 which can selectively engage the sun gear to the housing 36 of the planetary gear set 18 to provide resistance to or prevent rotation of the sun gear C.

The present disclosure combines a single mode electrically variable transmission with the brake 34 on the sun gear C to create a flywheel charge/discharge control device covering a wide range of flywheel to vehicle speeds and capable of high power charge/discharge at good efficiency. Typically during driving, the flywheel 20 would be maintained within a speed band so that it is capable of accepting significant power from the system. However, when the vehicle is initially turned on, the flywheel 20 would normally be at zero speed. While the vehicle is being accelerated, the control system 30 would begin to charge the flywheel 20 to its minimum operating speed using the electrically variable transmission 310 to transfer power from the axle 26 to the flywheel 20. Once the flywheel 20 is at a minimum speed, it would be maintained at that speed by the electrically variable transmission 310. When the vehicle brakes are applied, the controller 30 would control the electrically variable transmission to apply a braking torque to the axle 26 and increase the speed of the flywheel 20. At low braking levels, the friction brake 34 would not be needed, however the friction brake 34 could be used at high braking levels within a predetermined range of vehicle and flywheel speeds where the clutch slip speed allows braking torque to be produced efficiently. After the braking maneuver is completed, the control system 30 would allow the flywheel energy to be discharged during acceleration, either when it provides a fuel economy benefit, or when desired for vehicle performance. Use of the electrically variable transmission 310 allows the flywheel 20 to be efficiently discharged even in very low vehicle speeds. At high vehicle speeds and high acceleration levels, the friction brake 34 would be used to increase the discharge rate of the flywheel 20 beyond what the electrically variable transmission 310 can support.

With reference to FIGS. 5 and 6, an electrically variable transmission 410 of a hybrid vehicle will now be described. The electrically variable transmission 410 has a compound split configuration. The hybrid vehicle can include an engine that supplies drive torque through a transmission to a pair of drive wheels. The electrically variable transmission 410 can be implemented either on the same or separate axle from the driven axle for driving a pair of drive wheels 12. The electrically variable transmission 410 includes a first motor generator 14 and a second motor generator 16 to provide driving input to a planetary gear set or differential gear set 418 that is represented in lever diagram form by a four-node lever (described in further detail herein). A flywheel 20 is also drivingly connected to the planetary/differential gear set 418 by a reduction gear 22. The planetary/differential gear set 418 is also connected to a final drive gear/differential 24 that provides drive torque to the drive wheels 12 via a drive axle 26. The first motor generator 14 is connected to the planetary gear set 18 by a reduction gear 28. The first motor generator 14 and the second motor generator 16 are each controlled by a controller 30 which is connected to the vehicle electrical system 32 including a battery which can provide or receive electrical power to and from the first and second motor generators 14, 16.

The planetary/differential gear set 418 is a compound multi-stage planetary gear set which is represented by a four-node lever having a first member, a second member, a third member, and a fourth member which are represented by nodes A, B1, B2, and C, respectively. The members may be a ring gear member A, a sun gear member C, and first and second carrier members B1, B2. As used herein, a "node" is a component of a transmission, such as a ring gear member, a carrier member, or a sun gear member, which is characterized by a rotational speed and which can act as a junction of torques applied to that component from other components, and by that component to other components. The other components which may interact with a given node include other coaxial members of the same set of planetary gears which appear as other nodes on the same lever. The other components which may interact with a given node also include interconnections to members of other planetary gear sets which appear as additional nodes along the lever.

As illustrated in FIGS. 5 and 6, the flywheel 20 is connected through the reduction gear 22 to the node A representing the sun gear S1 of the planetary gear set 418. The first motor generator 14 is connected through a reduction gear 28 to the second node B2 which is representative of a first ring gear R1 and a second planetary carrier C2 of the planetary gear set 418. The second motor generator 16 is connected to the node C which is representative of the second sun gear S2 of the planetary gear set 418. The sun gear S2 represented by node C is also connected to a brake 34 which can selectively engage the sun gear S2 to the housing 36 of the planetary gear set 418 to provide resistance to or prevent rotation of the sun gear C. The node B2 is also connected to a brake 38 which can selectively engage the first ring gear R1 and the second planetary carrier C2 to the housing 36 of the planetary gear set 418 to provide resistance to or prevent rotation of the first ring gear R1 and the second planetary carrier C2. The node B1 which is representative of the second first carrier C1 and the second ring gear R2 of the planetary/differential gear set 418 is connected to the final drive gear/differential 24 that provides drive torque to the drive wheels 12 via a drive axle 26.

The present disclosure combines a single mode electrically variable transmission with the brake 34 on the sun gear C to create a flywheel charge/discharge control device covering a wide range of flywheel to vehicle speeds and capable of high power charge/discharge at good efficiency. Typically during driving, the flywheel 20 would be maintained within a speed band so that it is capable of accepting significant power from the system. However, when the vehicle is initially turned on, the flywheel 20 would normally be at zero speed. While the vehicle is being accelerated, the control system 30 would begin to charge the flywheel 20 to its minimum operating speed using the electrically variable transmission 410 to transfer power from the axle 26 to the flywheel 20. Once the flywheel 20 is at a minimum speed, it would be maintained at that speed by the electrically variable transmission 410. When the vehicle brakes are applied, the controller 30 would control the electrically variable transmission to apply a braking torque to the axle 26 and increase the speed of the flywheel 20. At low braking levels, the friction brakes 34, 38 would not be needed, however the friction brakes 34, 38 could be used at high braking levels within a predetermined range of vehicle and flywheel speeds where the clutch slip speed allows braking torque to be produced efficiently. After the braking maneuver is completed, the control system 30 would allow the flywheel energy to be discharged during acceleration, either when it provides a fuel economy benefit, or when desired for vehicle performance. Use of the electrically variable transmission 410 allows the flywheel 20 to be efficiently discharged even in very low vehicle speeds. At high vehicle speeds and high acceleration levels, the friction brakes 34, 38 would be used to increase the discharge rate of the flywheel 20 beyond what the electrically variable transmission 410 can support.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A kinetic energy recovery system for a vehicle, comprising:
    a pair of drive wheels each drivingly connected to a differential mechanism;
    a planetary gear set including a plurality of components and drivingly connected to said differential mechanism;
    a first motor generator drivingly connected to a first component of said plurality of components of said planetary gear set independent of other components of said plurality of components of said planetary gear set;
    a second motor generator drivingly connected to a second component of said plurality of components said planetary gear set independent of other components of said plurality of components of said planetary gear set;
    a flywheel drivingly connected to a third component of said planetary gear set by a reduction gear mechanism and independent of other components of said plurality of components of said planetary gear set;
    a first brake connected to one of said plurality of components of said planetary gear set, wherein said first brake is selectively engaged irrespective of the direction of rotation to prevent rotation of said one of said plurality of components of said planetary gear set to control delivery of torque to and from the flywheel; and
    wherein said first component is a planetary carrier.

2. The kinetic energy recovery system according to claim 1, wherein said first motor generator is drivingly connected to said first component by a second reduction gear mechanism.

3. The kinetic energy recovery system according to claim 1, further comprising a controller for controlling operation of said first and second motor generators and said first brake.

4. The kinetic energy recovery system according to claim 1, further comprising a second brake connected to another one of said plurality of components of said planetary gear set other than said one of said plurality of components of said planetary gear set that said first brake is connected to.

5. The kinetic energy recovery system according to claim 1, wherein said plurality of components of said planetary gear set include at least one sun gear, at least one ring gear, and at least one planetary carrier rotatably supporting a plurality of planetary gears in meshing engagement with at least one of said at least one sun gear and said at least one ring gear.

6. The kinetic energy recovery system according to claim 5, wherein the first motor generator is drivingly connected to the first component one of the planetary gear set in the form of the at least one planetary carrier, the flywheel is drivingly connected to the third component of the planetary gear set in the form of the at least one ring gear and the second motor generator is connected to the second component of the planetary gear set in the form of the at least one sun gear.

7. The kinetic energy recovery system according to claim 1, wherein said planetary gear set includes a multi-stage planetary gear set.

8. The kinetic energy recovery system according to claim 1, wherein the third component of said plurality of components of the planetary gear set is a ring gear.

9. The kinetic energy recovery system according to claim 1, further comprising a controller for controlling the first motor generator and the second motor generator to charge the flywheel to a minimum operating speed.

10. The kinetic energy recovery system according to claim 9, wherein the controller controls the first brake to increase the speed of the flywheel.

11. The kinetic energy recovery system according to claim 9, wherein said controller discharges energy from the flywheel to accelerate the vehicle.

* * * * *